US012391787B2

(12) United States Patent
Schuette et al.

(10) Patent No.: US 12,391,787 B2
(45) Date of Patent: Aug. 19, 2025

(54) POLYURETHANE FOAMS WITH REDUCED AROMATIC AMINE CONTENT

(71) Applicant: BASF SE, Ludwigshafen am Rhein (DE)

(72) Inventors: Markus Schuette, Lemfoerde (DE); Heinz-Dieter Lutter, Lemfoerde (DE); Manuela Faehmel, Lemfoerde (DE); Marc Claude Martin, Lemfoerde (DE); Peter Deglmann, Ludwigshafen (DE); Joern Duwenhorst, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 193 days.

(21) Appl. No.: 17/288,026

(22) PCT Filed: Oct. 23, 2019

(86) PCT No.: PCT/EP2019/078914
§ 371 (c)(1),
(2) Date: Apr. 23, 2021

(87) PCT Pub. No.: WO2020/084003
PCT Pub. Date: Apr. 30, 2020

(65) Prior Publication Data
US 2021/0395431 A1  Dec. 23, 2021

(30) Foreign Application Priority Data
Oct. 24, 2018 (EP) .................... 18202395

(51) Int. Cl.
C08G 18/08 (2006.01)
C08G 18/16 (2006.01)
C08G 18/18 (2006.01)
C08G 18/20 (2006.01)
C08G 18/24 (2006.01)
C08G 18/38 (2006.01)
C08G 18/48 (2006.01)
C08G 18/63 (2006.01)
C08G 18/76 (2006.01)
C08G 101/00 (2006.01)

(52) U.S. Cl.
CPC ........... C08G 18/14 (2013.01); C08G 18/165 (2013.01); C08G 18/1825 (2013.01); C08G 18/2027 (2013.01); C08G 18/242 (2013.01); C08G 18/3844 (2013.01); C08G 18/4845 (2013.01); C08G 2101/00 (2013.01); C08G 2110/0008 (2021.01); C08G 2110/005 (2021.01); C08G 2110/0058 (2021.01); C08G 2110/0083 (2021.01)

(58) Field of Classification Search
None
See application file for complete search history.

(56) References Cited

U.S. PATENT DOCUMENTS

| 6,495,611 | B1 | 12/2002 | Arlt et al. |
| 2003/0192455 | A1 | 10/2003 | Six et al. |
| 2008/0194718 | A1 | 8/2008 | Schuster et al. |
| 2010/0113634 | A1* | 5/2010 | Tokumoto .......... C08G 18/3281 521/115 |
| 2013/0225706 | A1* | 8/2013 | Ma ..................... C08G 18/4845 521/110 |
| 2015/0336306 | A1* | 11/2015 | Hahn ..................... B29C 44/04 264/51 |
| 2017/0239857 | A1* | 8/2017 | Holeschovsky ... C08G 18/3206 |

FOREIGN PATENT DOCUMENTS

| DE | 19919827 A1 | 11/2000 |
| DE | 19928675 A1 | 12/2000 |
| DE | 19928676 A1 | 12/2000 |
| DE | 19928687 A1 | 12/2000 |
| DE | 19928688 A1 | 12/2000 |
| DE | 19928689 A1 | 12/2000 |
| EP | 1461193 A1 | 9/2004 |
| EP | 1888664 A2 | 2/2008 |

(Continued)

OTHER PUBLICATIONS

"CAS Registry No. 189253-72-3", CAS SciFinder, accessed Apr. 2024 (Year: 2024).*

(Continued)

Primary Examiner — Melissa A Rioja
(74) Attorney, Agent, or Firm — Armstrong Teasdale LLP

(57) ABSTRACT

Described herein is a process for producing polyurethane foams having a density of 30 g/dm³ to 70 g/dm³, in which (a) aromatic polyisocyanate is mixed with (b) polymeric compounds having isocyanate-reactive groups, (c) optionally chain extender and/or crosslinking agent, (d) catalyst, (e) blowing agent including water, (f) 0.1% to 5% by weight of lactam, and (g) optionally additives, at an isocyanate index of 50 to 95 to form a reaction mixture, and the reaction mixture is converted to the polyurethane foam, wherein the catalyst includes metal catalyst and amine catalyst, and the amine catalyst has tertiary nitrogen atoms and the content of tertiary nitrogen atoms in the amine catalyst is from 0.0001 to 0.003 mol/100 g of foam. Also described herein is a polyurethane foam and a method of using such a flexible polyurethane foam for the production of cushions, seat cushions, or mattresses.

15 Claims, No Drawings

(56) References Cited

FOREIGN PATENT DOCUMENTS

JP        S60144316 A    7/1985
WO        0066643 A1    11/2000

OTHER PUBLICATIONS

English Translation of the International Search Report for corresponding International Application No. PCT/EP2019/078914, mailed Jan. 20, 2020, 2 pages.
European Search Report for EP Patent Application No. 18202395.2, Issued on May 3, 2019, 3 pages.
Schwetlick, et al., "Three fundamental mechanisms of base-catalysed reactions of isocyanates with hydrogen-acidic compounds", Journal of the Chemical Society, Perkin Transactions 2, vol. 2, Issue 3, 1994, pp. 599-608.

* cited by examiner

POLYURETHANE FOAMS WITH REDUCED AROMATIC AMINE CONTENT

CROSS-REFERENCE TO RELATED APPLICATIONS

This application is a U.S. National Phase Application of International Patent Application No. PCT/EP2019/078914, filed Oct. 23, 2019, which claims the benefit of priority to European Patent Application No. 18202395.2, filed Oct. 24, 2018, the entire contents of which are hereby incorporated by reference herein.

The present invention relates to a process for producing polyurethane foams having a density of 30 g/dm$^3$ to 70 g/dm$^3$, in which (a) aromatic polyisocyanate is mixed with (b) polymeric compounds having isocyanate-reactive groups, (c) optionally chain extender and/or crosslinking agent, (d) catalyst, (e) blowing agent, comprising water, (f) 0.1% to 5% by weight of lactam, based on the total weight of components (a) to (f), and (g) optionally additives, at an isocyanate index of 50 to 95 to form a reaction mixture, and the reaction mixture is converted to the polyurethane foam, wherein the catalyst comprises metal catalyst and amine catalyst and the amine catalyst has tertiary nitrogen atoms and is used in such an amount that the content of tertiary nitrogen atoms in the amine catalyst, based on the weight of starting components (a) to (e), is from 0.0001 to 0.003 mol/100 g of foam. The present invention further relates to a polyurethane foam obtainable by such a process and to the use of such a flexible polyurethane foam for the production of cushions, seat cushions and mattresses.

Under certain conditions, in particular with water contents of greater than 1% by weight and an isocyanate index of less than 100, aromatic amines, in particular toluenediamine (TDA) and methylenediphenylenediamine (MDA), can be detected in a concentration range of 10-200 ppm in polyurethane foams. These occur in particular on the surface of molded foams. Because of their carcinogenic and genotoxic potential, aromatic amines have been subject to numerous internal and external studies for decades. Known measures for reducing (but not eliminating!) the content of aromatic amines involve the use of reactive scavenger compounds such as for example carboxylic anhydrides or aliphatic isocyanates.

It is known that the use of various amine scavengers can reduce the content of aromatic amines. For instance, EP1461193 describes a release agent and a process for producing plastics moldings involving the use, for producing plastics moldings, of release agents which reduce the concentration of undesirable, potentially health-hazardous substances in the edge zone and at the surface of the molding, and also a process for producing plastics moldings with a low content of harmful substances using such release agents. Among other components, one or more additives from the group of derivatives of organic acids, derivatives of carbonic acid, di- or polyisocyanates, aliphatic, cycloaliphatic, araliphatic, aromatic and heterocyclic isocyanates and derivatives of mineral acids are used.

DE-A 199 19 826, DE-A 199 19 827, DE-A 199 28 675, DE-A 199 28 676, DE-A 199 28 687, DE-A 199 28 688 and DE-A 199 28 689 reveal a large number of lower-cost additions and auxiliaries from various chemical compound classes, the use of which is intended to reduce the intermediate formation of primary aromatic diamines such as TDA or MDA (methylenediphenylenediamine) during the production of flexible polyurethane foams. In the examples, these reactive components are usually added in an amount of approx. 5% by weight, based on the isocyanate-reactive substances. DE19928687 also discloses, inter alia, the use of lactams. A general disadvantage of the addition of such auxiliaries for plastics formulation, which act as "scavenger" for undesired substances, consists in the occurrence of significant changes to the mechanical properties of the end product, which possibly makes it necessary to redevelop or further develop the composition of the formulation or of the polymer raw material. This is all the more true since considerable amounts of the auxiliary usually need to be added in order to effectively reduce the undesired substances, which results in impairment of the mechanical properties of the foam.

It is a disadvantage that very high amounts of amine scavengers have to be used in order to reduce the content of MDA. In particular in the case of a high water content of greater than 1% by weight and a low isocyanate index of less than 100, however, the reduction in aromatic amines using the processes described enjoys only an unsatisfactory level of success. The high proportion of amine scavengers further leads to the scavenger substances being driven out and hence to an increased emission of volatile organic substances.

An object of the present invention was therefore to provide a process for producing polyurethane foams which, despite a high content of environmentally friendly blowing agent water and a low isocyanate index of less than 95, results in foams having a markedly reduced content of aromatic amines, especially at the surface of molded foams. One possible explanation for the occurrence of MDA at isocyanate indices of less than 100 is the fact that there are not enough isocyanate groups available during the formation of the polyurethane foams to further react with MDA— which is formed via the isocyanate-water reaction—to give urea bonds. The MDA thus formed can accumulate in particular during the production of molded foams by condensation at the interface with the colder mold surface.

The object according to the invention is surprisingly achieved by a process for producing polyurethane foams having a density of 30 g/dm$^3$ to 70 g/dm$^3$, in which (a) aromatic polyisocyanate is mixed with (b) polymeric compounds having isocyanate-reactive groups, (c) optionally chain extender and/or crosslinking agent, (d) catalyst, (e) blowing agent, comprising water, (f) 0.1% to 5% by weight of lactam, based on the total weight of components (a) to (f), and (g) optionally additives, at an isocyanate index of 50 to 95 to form a reaction mixture, and the reaction mixture is converted to the polyurethane foam, wherein the catalyst comprises metal catalyst and amine catalyst and the amine catalyst has tertiary nitrogen atoms and is used in such an amount that the content of tertiary nitrogen atoms in the amine catalyst, based on the weight of starting components (a) to (e), is 0.0003 to 0.001 mol/100 g of foam. The present invention further relates to a polyurethane foam obtainable by such a process and to the use of such a flexible polyurethane foam for the production of cushions, seat cushions and mattresses.

The polyurethane foam according to the invention is preferably understood to be a flexible polyurethane foam. This has a density of 30 to 70 g/l, preferably 40 to 60 g/l and in particular 45 to 55 g/l. The polyurethane foams according to the invention preferably also have an indentation hardness according to DIN EN ISO 2439, method A, of less than 800 N, particularly preferably less than 500 N, more preferably less than 200 N and in particular of less than 100 N. The compression set, measured at 70° C., 50% compression over 22 hours according to DIN EN ISO 1856, is preferably less than 20%, particularly preferably less than 15%, more preferably less than 10% and in particular less than 5%.

Aromatic polyisocyanates (a) which can be used include all aromatic isocyanates typically used in polyurethane chemistry. These preferably comprise toluene diisocyanate isomers (TDI isomers) and isomers of methylenediphenylene diisocyanate and its higher polycyclic homologs (referred to as MDI). The aromatic polyisocyanate used is particularly preferably a mixture comprising 2,4'-MDI, 4,4'-MDI and higher polycyclic homologs of MDI. It is furthermore also possible to use modified isocyanates, such as isocyanates which are formed by incorporation of groups derived from isocyanate groups in the polyisocyanates. Examples of such groups are allophanate, carbodiimide, uretonimine, isocyanurate, urea and biuret groups. In a preferred embodiment, the proportion of diphenylmethane 2,4'-diisocyanate is preferably 5% to 30% by weight and that of diphenylmethane 4,4'-diisocyanate is preferably 40% to 80% by weight, based in each case on the total weight of aromatic polyisocyanates (a). In a preferred embodiment, the proportion of higher polycyclic homologs of diphenylmethane diisocyanate is 3% to 30% by weight, particularly preferably 5% to 25% by weight.

The aromatic polyisocyanates may also be used in the form of prepolymers. To this end, the aromatic polyisocyanates (a1) described above are reacted in excess with compounds comprising isocyanate-reactive compounds (a2). The compounds (a2) used here are preferably the polymeric compounds having isocyanate-reactive groups which are mentioned under (b). If isocyanate prepolymers are used as aromatic isocyanates (a), these preferably have an NCO content of 16% to 31% by weight.

Polymeric compounds having isocyanate-reactive groups (b) have a number-average molecular weight of at least 450 g/mol, particularly preferably 460 to 12 000 g/mol and have at least two isocyanate-reactive hydrogen atoms per molecule. Preferred polymeric compounds having isocyanate-reactive groups (b) which can be considered are polyester alcohols, and/or polyether alcohols having a functionality of 2 to 8, in particular of 2 to 6, preferably of 2 to 4, and a mean equivalent molecular weight in the range from 400 to 3000 g/mol, preferably 1000 to 2500 g/mol. Polyether alcohols are used in particular.

The polyether alcohols can be prepared by known methods, usually by catalytic addition of alkylene oxides, especially ethylene oxide and/or propylene oxide, onto H-functional starter substances, or by condensation of tetrahydrofuran. When alkylene oxides are added on, the term polyalkylene oxide polyols is also used. H-functional starter substances that can be used are in particular polyfunctional alcohols and/or amines. Preference is given to using water, dihydric alcohols, for example ethylene glycol, propylene glycol, or butanediols, trihydric alcohols, for example glycerol or trimethylolpropane, and higher polyhydric alcohols, such as pentaerythritol, sugar alcohols, for example sucrose, glucose or sorbitol. Amines used with preference are aliphatic amines having up to 10 carbon atoms, for example ethylenediamine, diethylenetriamine, propylenediamine, and amino alcohols such as ethanolamine or diethanolamine. Alkylene oxides used are preferably ethylene oxide and/or propylene oxide, where in the case of polyether alcohols, which are used for the production of flexible polyurethane foams, an ethylene oxide block is frequently added on to the chain end. Catalysts used when adding on the alkylene oxides are in particular basic compounds, with potassium hydroxide having the greatest industrial significance here. If the intention is to have a low content of unsaturated constituents in the polyether alcohols, catalysts used may also be di- or multi-metal cyanide compounds, so-called DMC catalysts. Di- and/or trifunctional polyalkylene oxide polyols are used in particular for the production of viscoelastic flexible polyurethane foams.

In addition, the compound having at least two active hydrogen atoms used can be polyester polyols, preparable for example from organic dicarboxylic acids having 2 to 12 carbon atoms, preferably aliphatic dicarboxylic acids having 8 to 12 carbon atoms and polyhydric alcohols, preferably diols, having 2 to 12 carbon atoms, preferably 2 to 6 carbon atoms. Examples of useful dicarboxylic acids include: succinic acid, glutaric acid, adipic acid, suberic acid, azelaic acid, sebacic acid, decanedicarboxylic acid, maleic acid, fumaric acid, phthalic acid, isophthalic acid, terephthalic acid, and the isomeric naphthalenedicarboxylic acids. Preference is given to using adipic acid. The dicarboxylic acids may be used here either individually or in a mixture with one another. Instead of the free dicarboxylic acids it is also possible to use the corresponding dicarboxylic acid derivatives, for example dicarboxylic esters of alcohols having 1 to 4 carbon atoms or dicarboxylic anhydrides.

Examples of di- and polyhydric alcohols, especially diols, are: ethanediol, diethylene glycol, propane-1,2- and -1,3-diol, dipropylene glycol, butane-1,4-diol, pentane-1,5-diol, hexane-1,6-diol, decane-1,10-diol, glycerol and trimethylolpropane. It is preferable to use ethanediol, diethylene glycol, butane-1,4-diol, pentane-1,5-diol, hexane-1,6-diol or mixtures of at least two of the diols mentioned, in particular mixtures of butane-1,4-diol, pentane-1,5-diol and hexane-1,6-diol. It is also possible to use polyester polyols formed from lactones, for example ε-caprolactone, or hydroxycarboxylic acids, for example ω-hydroxycaproic acid and hydroxybenzoic acids. Preference is given to using dipropylene glycol.

Chain extenders and/or crosslinking agents (c) used are substances having a molecular weight of less than 400 g/mol, preferably of 60 to 350 g/mol, with chain extenders having 2 isocyanate-reactive hydrogen atoms and crosslinking agents having at least 3 isocyanate-reactive hydrogen atoms. These may be used individually or in the form of mixtures. It is preferable to use diols and/or triols having molecular weights of less than 400, particularly preferably of 60 to 300 and in particular 60 to 150. Useful examples of starter molecules include aliphatic, cycloaliphatic and/or aromatic diols, and diols including aromatic structures, having 2 to 14, preferably 2 to 10, carbon atoms, for example ethylene glycol, propane-1,3-diol, decane-1,10-diol, o-, m-, p-dihydroxycyclohexane, diethylene glycol, dipropylene glycol and preferably butane-1,4-diol, hexane-1,6-diol and bis(2-hydroxyethyl)hydroquinone, triols such as 1,2,4-, 1,3, 5-trihydroxycyclohexane, glycerol and trimethylolpropane and low molecular weight hydroxyl group-containing polyalkylene oxides based on ethylene oxide and/or 1,2-propylene oxide and the aforementioned diols and/or triols. Chain extenders (c) used are particularly preferably monoethylene glycol, butane-1,4-diol and/or glycerol.

If chain extenders, crosslinking agents or mixtures thereof are used, these are advantageously used in amounts of 0.1% to 20% by weight, preferably 0.5% to 10% by weight and in particular 0.8% to 5% by weight, based on the weight of components (b) and (c).

Catalysts (d) used for producing the polyurethane foams according to the invention are metal catalyst and amine catalyst which has tertiary nitrogen atoms. In the context of the present invention, compounds having a tertiary nitrogen atom preferred as amine catalysts are those having a relative reactivity, based on triethylenediamine, of at least 5%. The relative reactivity is ascertained here by ascertaining the rate constant of the compound to be tested in the butanol-phenyl isocyanate model system with a concentration of 0.50 mol/liter in each case at 50° C. in the solvent acetonitrile and comparing it with that of 1,4-diazabicyclo[2.2.2]octane (triethylenediamine). A relative reactivity of at least 5% results if the rate constant for the catalyst to be tested under otherwise identical conditions is smaller than the rate constant when using 1,4-diazabicyclo[2.2.2]octane by at most a factor of 20. Details on determining the rate constant are described in Schwetlick et al. in J. Chem. Soc Perkin Trans. 2, 1994, pages 599 to 608 (rate constant $k_b$ for 1,4-diazabicyclo[2.2.2]octane under the conditions mentioned=2.68 $dm^6\ mol^{-2}\ s^{-1}$). The amine catalysts preferably comprise reactive amine catalysts, that is to say those comprising isocyanate-reactive groups. These have at least one, preferably 1 to 8 and particularly preferably 1 to 2, isocyanate-reactive groups such as primary amine groups, secondary amine groups, hydroxyl groups, amides or urea groups, preferably primary amine groups, secondary amine groups or hydroxyl groups and particularly preferably primary amine groups or hydroxyl groups. Incorporable amine catalysts are mostly used for the preparation of low-emission polyurethanes which are especially used in automobile interiors. Such catalysts are known and described for example in EP1888664. They comprise compounds which, in addition to the isocyanate-reactive group(s), preferably have one or more, preferably two, tertiary amino groups.

It is preferable when the tertiary amino groups of the incorporable catalysts bear at least two aliphatic hydrocarbon radicals, preferably having 1 to 10 carbon atoms per radical, particularly preferably having 1 to 6 carbon atoms per radical. It is particularly preferable when the tertiary amino groups bear two radicals independently selected from methyl ($H_3C—$) and ethyl radicals ($H_3C—H_2C—$) and a further organic radical. Examples of incorporable catalysts that are used in a preferred embodiment of the invention are selected from the group consisting of bisdimethylaminopropylurea, bis(N,N-dimethylaminoethoxyethyl)carbamate, dimethylaminopropylurea, N,N,N-trimethyl-N-hydroxyethylbis(aminopropyl ether), N,N,N-trimethyl-N-hydroxyethylbis(aminoethyl ether), diethylethanolamine, bis(N,N-dimethyl-3-aminopropyl)amine, dimethylaminopropylamine, 3-dimethylaminopropyl-N,N-dimethylpropane-1,3-diamine, dimethyl-2-(2-aminoethoxyethanol) and (1,3-bis(dimethylamino)propan-2-ol), N,N-bis(3-dimethylaminopropyl)-N-isopropanolamine, bis(dimethylaminopropyl)-2-hydroxyethylamine, N,N,N-trimethyl-N-(3 aminopropyl)bis(aminoethyl ether), 3-dimethylaminoisopropyldiisopropanolamine, N-[2-[2-(dimethylamino)ethoxy]ethyl]-N-methyl-1,3-propanediamine and mixtures thereof. Particular preference is given to using N-[2-[2-(dimethylamino)ethoxy]ethyl]-N-methyl-1,3-propanediamine.

In addition to the incorporable amine catalysts, it is possible to use further conventional amine catalysts for preparing the polyurethanes. These are preferably selected from the group consisting of 2,3-dimethyl-3,4,5,6-tetrahydropyrimidine, triethylamine, tributylamine, dimethylbenzylamine, N-methyl-, N-ethyl-, N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, tetramethyl diaminoethyl ether, bis(dimethylaminopropyl)urea, dimethylpiperazine, 1,2-dimethylimidazole, 1-azabicyclo[3.3.0]octane and preferably 1,4-diazabicyclo[2.2.2]octane, and mixtures thereof.

The amine catalyst is used here in such an amount that the content of tertiary nitrogen atoms is from 0.0001 to 0.003 mol/100 g of foam, preferably 0.0004 to 0.002 and in particular 0.0005 to 0.001 mol per 100 g of foam. The amine catalysts preferably comprise exclusively incorporable amine catalysts.

Metal catalysts used can be any customary metal catalysts. These include organic metal compounds, preferably organic tin compounds, such as tin(II) salts of organic carboxylic acids, for example tin(II) acetate, tin(II) octoate, tin(II) ethylhexanoate and tin(II) laurate, and the dialkyltin (IV) salts of organic carboxylic acids, for example dibutyltin diacetate, dibutyltin dilaurate, dibutyltin maleate and dioctyltin diacetate, dibutyltin dineodecanoate, and also bismuth carboxylates, such as bismuth(III) neodecanoate, bismuth 2-ethylhexanoate and bismuth octanoate, or mixtures thereof. Metal catalysts selected are preferably those metal catalysts which are stable to hydrolysis, such as for example tin(IV) compounds. Dibutyltin dineodecanoate is used as metal catalyst in particular.

The catalysts and the catalyst amounts to be used are selected here such that the polyurethane reaction mixture preferably has a rise time of 30 to 150 seconds, particularly preferably 40 to 110 seconds and in particular 50 to 105 seconds, taking into account the limitation of amount according to the invention for tertiary nitrogen. The rise time is understood to be the time to reach the maximum height in the beaker test with a weight of 100 g of polyol component and 50 g of isocyanate component. Furthermore, the cream time is preferably in the range from 10 to 30 seconds, particularly preferably 12 to 25 seconds and in particular 14 to 22 seconds, and the gel or fiber time is preferably 60 to 180 seconds, particularly preferably 70 to 160 seconds, and in particular 75 to 145 seconds. The cream time and gel time are determined here according to DIN EN 14315-1:2013 at 25° C. in the beaker test with a weight of 100 g of polyol component and 50 g of isocyanate component.

One or more blowing agents (e) are also present during the production of polyurethane foams. As blowing agents (e), it is possible to use chemically acting blowing agents and/or physically acting compounds. Chemical blowing agents are to be understood as meaning compounds which form gaseous products, for example water or formic acid, by reaction with isocyanate. Physical blowing agents are to be understood as meaning compounds which are dissolved or emulsified in the starting materials for the production of polyurethane and vaporize under the conditions of polyurethane formation. These are, for example, hydrocarbons, halogenated hydrocarbons and other compounds such as perfluorinated alkanes, e.g. perfluorohexane, chlorofluorocarbons, and ethers, esters, ketones and/or acetals, for example (cyclo)aliphatic hydrocarbons having from 4 to 8 carbon atoms, fluorinated hydrocarbons such as Solkane® 365 mfc, or gases such as carbon dioxide.

In a preferred embodiment, the blowing agent used is a mixture of these blowing agents comprising water, more preferably exclusively water. The amount of blowing agent is selected here such that the density of the polyurethane foam of the invention is in the range from 30 to 70 g/l, preferably 40 to 60 g/l and in particular 45 to 55 g/l. In particular, exclusively water is used in an amount of 1% to 6% by weight, preferably 2% to 5% by weight and in particular 2.5% to 4.5% by weight, based on the total weight of components (b) to (f).

The reaction mixture also comprises lactam (f). In the context of the invention, "lactam" is understood to mean cyclic amides which may be substituted. In this case the amide bond is situated in the ring, and preferably there is only one amide group in the ring. Examples of according to the invention are β-propiolactam, 2-pyrrolidone, N-methylpyrrolidone, γ-butyrolactam, δ-valerolactam (2-piperidone) and ε-lactam (ε-caprolactam). Particular preference is given to using ε-caprolactam.

Examples of auxiliaries and/or additives (g) used include surface-active substances, foam stabilizers, cell regulators, external and internal release agents, fillers, pigments, dyes, flame retardants, antistats, hydrolysis stabilizers and fungistatic and bacteriostatic substances.

Further details of the starting materials used can be found, for example, in the Kunststoffhandbuch [Plastics Handbook], volume 7, Polyurethane [Polyurethanes], edited by Günter Oertel, Carl-Hanser-Verlag, Munich, third edition 1993, chapter 5, Polyurethanweichschaumstoffe [Flexible polyurethane foams].

When producing the polyurethane foams according to the invention, usually the polymeric compounds having isocyanate-reactive groups (b), the optionally used chain extenders and/or crosslinking agents (c), the catalysts (d), the blowing agents (e), lactams (f) and the auxiliaries and/or additives (g) optionally also used are mixed to form a so-called polyol component and in this form are reacted with the polyisocyanates a).

For the production of the polyurethane foams according to the invention, the aromatic polyisocyanates (a) are reacted with the polymeric compounds having isocyanate-reactive groups in the presence of the cited blowing agents, catalysts and auxiliaries and/or additives (polyol component). The mixing ratios chosen here are such that the equivalence ratio of NCO groups in the polyisocyanates (a) to the sum total of reactive hydrogen atoms in components (b) and (f) and, if present, (c) and (d) is preferably 0.5 to 0.95:1, preferably 0.6 to 0.8:1 and in particular 0.65 to 0.75:1. A ratio of 1:1 corresponds here to an isocyanate index of 100.

The polyurethane foams of the invention are preferably produced by the one-shot method, for example using high-pressure or low-pressure technology. The foams of the invention are produced here, for example, on a belt or preferably in a mold. The molded polyurethane foams can be produced in open or closed, for example metallic, molds.

It is particularly advantageous to proceed by what is called the two-component method, in which, as set out above, a polyol component is produced and foamed with polyisocyanate (a). The components are preferably mixed at a temperature in the range between 15 and 120° C., preferably 20 to 80° C., and introduced into the mold or onto the conveyor belt. The temperature in the mold is usually between 15 and 120° C., preferably between 30 and 80° C. The molded polyurethane foam thus obtained is also a subject of the present invention. This foam is preferably open-cell and can be used without flexing. It also has a preferably tack-free surface.

Polyurethane foams of the invention are preferably used in vehicle construction, for example as carpet backing, for upholstered furniture, seating furniture or reclining furniture, for mattresses or cushions. A further field of use is in automobile safety components, supporting surfaces, armrests and similar parts in the furniture sector and in automobile construction.

Surprisingly, it has been found that the use of lactam in combination with a gel and blow catalysis according to the invention makes it possible to significantly reduce the formation of aromatic amines, even with an isocyanate index of much less than 100 and a water proportion of much greater than 1% by weight, in particular at the surface of molded foams, and preferably makes it possible to lower this aromatic amine formation below the detection limit. It has furthermore been found that it was not possible to detect any free lactam as potential emission source in such foams within the application-relevant temperature ranges up to 90° C. during determination of the condensable constituents, measured at 90° C. in accordance with VDA 278 (fogging).

A further advantage is that the content of aldehydes, measured on the fully reacted foam, can likewise be markedly reduced, often by more than 50% relative to a conventionally catalyzed foam without addition of lactam. A deterioration in the mechanical properties such as for example in the compression set, which is to be feared due to the chain termination caused by lactam, was astonishingly also not detected. In contrast, an improvement in the mechanical properties can be observed after accelerated aging in an autoclave at 120° C. for 5 h and during storage under moisture and heat.

The invention shall be elucidated hereinbelow with reference to examples:

The following feedstocks were used to produce the polyurethane foams of the examples:

Polyol 1: A glycerol-started polyoxypropylene-polyoxyethylene having a polyoxyethylene content of 13% by weight based on the alkylene oxide content, a hydroxyl number of 28 mg KOH/g and predominantly primary hydroxyl groups.

Polyol 2: Polymer polyol based on styrene and acrylonitrile in a ratio of 2:1, solids content 44% by weight and a hydroxyl number of 20 mg KOH/g.

Polyol 3: Glycerol-started polyoxypropylene-polyoxyethylene having a polyoxyethylene content, based on the alkylene oxide content, of 74% by weight and a hydroxyl number of 42 mg KOH/g.

Polyol 4: Propylene glycol-started propoxylate having an OH number of 55.

Polyol 5: Glycerol-started polyoxypropylene-polyoxyethylene having a polyoxyethylene content of 14% by weight based on the alkylene oxide content and a hydroxyl number of 30 mg KOH/g.

Polyol 5: Polyoxypropylene-polyoxyethylene started with a mixture of glycerol and diethylene glycol (74 to 26 parts by weight) and having a polyoxyethylene content, based on the alkylene oxide content, of 10% by weight and a hydroxyl number of 48 mg KOH/g.

Polyol 6: Glycerol-started polyoxypropylene having a hydroxyl number of 42 mg KOH/g.

Catalyst 1: 33% by weight solution of triethylenediamine in dipropylene glycol.

Catalyst 2: Incorporable, tertiary amine catalyst from Evonik, obtainable under the trade name Dabco®NE 300 (N-[2-[2-(dimethylamino)ethoxy]ethyl]-N-methyl-1,3-propanediamine).

Catalyst 3: N,N-Dimethyl-N',N'-di(2-hydroxypropyl)-1,3-propanediamine, available from Huntsman under the trade name Jeffcat®DPA.

Catalyst 4: 3-(Dimethylamino)propylamine-started polyoxypropylene having a polyoxypropylene content of 77% by weight and a hydroxyl number of 250 mg KOH/g.

Catalyst 5: 3-(Dimethylamino)propylamine.

Catalyst 6: 1,4-Diazabicyclo[2.2.2]octane (25%) in butane-1,4-diol (75%).

Catalyst 7: Dabco® 2025 amine catalyst from EVONIK (formerly Air Products).

Catalyst 8: Diethanolamine.

Catalyst 9: Hydroxymethyltriethylenediamine (66.7% by weight) in dipropylene glycol.

Catalyst 10: N-[2-[2-(Dimethylamino)ethoxy]ethyl]-N-methyl-1,3-propanediamine (available from Evonik under the trade name Dabco NE 300).

Catalyst 11: N-(3-Dimethylaminopropyl)-N,N-diisopropanolamine (available from Huntsman under the trade name Jeffcat®DPA).

Catalyst 12: 10% by weight solution of dimethyltin dinedodecanoate in polyol 1, available under the trade name Fomrez®UL 28; PU catalyst from Momentive.

Catalyst 13: Zinc complex available from King Industries under the trade name K-Kat XK-614.

Isocyanate 1: Mixture of MDI and higher polycyclic homologs of MDI having a viscosity at 25° C. of 210 mPas and an NCO content of 31.5% by weight.

Isocyanate 2: Mixture of 49 parts by weight of 4,4'-MDI, 48.6 parts by weight of 2,4'-MDI and 2.4 parts by weight of 2,2'-MDI; the NCO content is 33.5% by weight.

Isocyanate 3: Monomeric 4,4'-MDI having an NCO content of 33.5% by weight. Stabilizer: Low-emission silicone stabilizer.

Scavenger: Dodecylsuccinic anhydride.

Proceeding from the starting materials given in table 1, test panels with dimensions of 18.5×19.5×3.8 cm were produced in a closed mold. This involved preparing a polyol component according to the compositions given in the tables, mixing said polyol component with the specified isocyanate component at the specified isocyanate index in a high-pressure mixing head at 35° C., and placing this mixture into the mold heated to 60° C. The amounts of the feedstocks are based on the parts by weight in percent, the content of tertiary nitrogen per 100 g of foam is given in mol/100 g of foam and the MDA concentration is given in ppm. Only compounds having a relative reactivity, based on triethylenediamine, of at least 5% were included for the calculation of the content of tertiary nitrogen. The molding was removed from the mold after 5 minutes; the density was approx. 50 g/dm$^3$.

TABLE 1

|  | Comparison 1 | Comparison 2 | Comparison 3 | Comparison 4 | Comparison 5 |
|---|---|---|---|---|---|
| Polyol component |  |  |  |  |  |
| Polyol 1 | 64.85 | 64.22 | 64.22 | 63.60 | 63.35 |
| Polyol 2 | 15.00 | 15.00 | 15.00 | 15.00 | 15.00 |
| Polyol 3 | 14.00 | 14.00 | 14.00 | 14.00 | 14.00 |
| Catalyst 1 | 0.10 | 0.10 | 0.10 | 0.10 | 0.10 |
| Catalyst 2 | 0.10 | 0.10 | 0.10 | 0.10 | 0.10 |
| Catalyst 3 | 1.00 | 1.00 | 1.00 | 1.00 | 1.00 |
| Catalyst 4 | 1.00 | 1.00 | 1.00 | 1.00 | 1.00 |
| Catalyst 12 | — | — | — | — | — |
| ε-caprolactam | 0.00 | 0.31 | 0.63 | 1.25 | 1.50 |
| Stabilizer | 0.50 | 0.50 | 0.50 | 0.50 | 0.50 |
| Water | 3.45 | 3.45 | 3.45 | 3.45 | 3.45 |
| Isocyanate component |  |  |  |  |  |
| Isocyanate 1 | 37.5 | 37.5 | 37.5 | 37.5 | 37.5 |
| Isocyanate 2 | 42.1 | 42.1 | 42.1 | 42.1 | 42.1 |
| Isocyanate 3 | 20.4 | 20.4 | 20.4 | 20.4 | 20.4 |
| Index | 75.0 | 75.0 | 75.0 | 75.0 | 75.0 |
| 2,4'-MDA | 87 | 77 | 70 | 57 | 32 |
| 4,4'-MDA | 6 | 5 | 4 | 3 | <1 |
| Tertiary nitrogen content/100 g of foam | 0.021 | 0.021 | 0.021 | 0.021 | 0.021 |

|  | Comparison 6 | Example 1 | Comparison 7 | Example 2 | Comparison 8 | Example 3 |
|---|---|---|---|---|---|---|
| Polyol component |  |  |  |  |  |  |
| Polyol 1 | 62.35 | 65.85 |  |  | 32 | 32 |
| Polyol 2 | 15.00 | 15.00 |  |  |  |  |
| Polyol 3 | 14.00 | 14.00 | 78 | 76.5 | 4.8 | 4.8 |
| Polyol 4 | — | — | 16 | 16 |  |  |
| Polyol 5 |  |  | 2 | 2 | 58.05 | 58.10 |
| Catalyst 1 | 0.10 | — | 0.4 |  |  |  |
| Catalyst 2 | 0.10 | 0.10 |  | 0.2 |  | 0.2 |
| Catalyst 3 | 1.00 | — |  |  |  |  |
| Catalyst 4 | 1.00 |  |  |  |  |  |
| Catalysts |  |  | 0.1 |  | 0.25 |  |
| Catalyst 6 |  |  |  |  | 0.45 |  |
| Catalyst 7 |  |  |  |  | 0.25 |  |
| Catalyst 8 |  |  |  |  | 0.2 | 0.2 |
| Catalyst 12 | — | 0.10 |  | 0.3 |  | 0.3 |
| Dodecylsuccinic anhydride | 2.50 | — |  |  |  |  |
| ε-caprolactam |  | 1.50 |  | 1.50 |  | 0.5 |
| Stabilizer | 0.50 | 0.50 | 0.02 | 0.02 | 0.4 | 0.4 |
| Water | 3.45 | 3.45 | 3.5 | 3.5 | 3.55 | 3.55 |

TABLE 1-continued

| Isocyanate component | | | | | | |
|---|---|---|---|---|---|---|
| Isocyanate 1 | 37.5 | 37.5 | 20 | 20 | 40 | 40 |
| Isocyanate 2 | 42.1 | 42.1 | 80 | 80 | 50 | 50 |
| Isocyanate 3 | 20.4 | 20.4 | | | 10 | 10 |
| Index | 75.0 | 75.0 | 75 | 75 | | |
| 2,4-MDA | | | 3 | <1 | | |
| 2,4'-MDA | 49 | <1 | 18 | <1 | 24 | <1 |
| 4,4'-MDA | 2 | <1 | <1 | <1 | 3 | <1 |
| Tertiary nitrogen content/100 g of foam | 0.021 | 0.00066 | 0.0043 | 0.00066 | 0.003 + x(Dabco 2025) | 0.0013 |

Further polyurethane foams were produced in accordance with table 2 in an analogous process and the mechanical properties were also ascertained in addition to the MDA content. These are also given in table 2. In comparative experiment 10 and example 8, an isocyanate prepolymer was respectively used which had been obtained from the components specified.

TABLE 2

| Polyol component | Comparison 9 | Example 4 | Example 5 | Example 6 | Example 7 | Comparison 10 | Example 8 |
|---|---|---|---|---|---|---|---|
| Polyol 1 | 64.85 | 63.85 | 66.25 | 65.15 | 65.05 | 76.6 | 76.6 |
| Polyol 2 | 15.00 | 15.00 | 15.00 | 15.00 | 15.00 | 15 | 15 |
| Polyol 3 | 14.00 | 14.00 | 14.00 | 14.00 | 14.00 | 2 | 2 |
| Catalyst 1 | 0.10 | — | — | — | — | 0.1 | |
| Catalyst 2 | 0.10 | 0.10 | 0.10 | 0.10 | 0.20 | | |
| Catalyst 3 | 1.00 | — | — | — | — | | |
| Catalyst 4 | 1.00 | | | | | 1.0 | |
| Catalyst 9 | | | | | | | 0.2 |
| Catalyst 10 | | | | | | 0.1 | 0.2 |
| Catalyst 11 | | | | | | 1 | |
| Catalyst 12 | — | 0.10 | 0.20 | 0.30 | 0.30 | | |
| Catalyst 13 | | | | | | | 0.3 |
| ε-caprolactam | — | 3.00 | 1.50 | 1.50 | 1.50 | | 1.5 |
| Stabilizer | 0.50 | 0.50 | 0.50 | 0.50 | 0.50 | 0.7 | 0.7 |
| Water | 3.45 | 3.45 | 3.45 | 3.45 | 3.45 | 3.5 | 3.5 |
| Isocyanate component | 14.00 | 14.00 | 14.00 | 14.00 | 14.00 | | |
| Isocyanate 1 | 37.5 | 37.5 | 37.5 | 37.5 | 37.5 | 36 | 36 |
| Isocyanate 2 | 42.1 | 42.1 | 42.1 | 42.1 | 42.1 | 32 | 32 |
| Isocyanate 3 | 20.4 | 20.4 | 20.4 | 20.4 | 20.4 | 20 | 20 |
| Polyol 3 | | | | | | 2 | 2 |
| Polyol 6 | | | | | | 10 | 10 |
| Index | 70.0 | 70.0 | 70.0 | 70.0 | 70.0 | 70 | 70 |
| Cream time [s] | 14 | 22 | 22 | 21 | 16 | 12 | 12 |
| Gel time [s] | 53 | 104 | 104 | 93 | 70 | 51 | 49 |
| Rise time [s] | 76 | 145 | 145 | 135 | 100 | 72 | 70 |
| 2,2'-MDA | | | | | | 6 | 1 |
| 2,4'-MDA | 96 | <1 | <1 | <1 | <1 | 78 | 2 |
| 4,4'-MDA | 7 | <1 | <1 | <1 | <1 | 5 | <1 |
| Tertiary nitrogen content/100 g of foam | 0.021 | 0.00066 | 0.00066 | 0.00066 | 0.0013 | 0.0072 | 0.0013 |

TABLE 3 lists the mechanical properties that were ascertained for the foams of comparative example 8 and examples 2 to 5.

| | Comparison 7 | Example 4 | Example 5 | Example 6 | Example 7 | Comparison 8 | Example 10 |
|---|---|---|---|---|---|---|---|
| Compression hardness 40% [kPa] | 4.1 | 6.4 | 6.4 | 5.0 | 4.9 | 3.9 | 3.6 |
| Compression hardness 65% [kPa] | 9.2 | 14.3 | 14.3 | 11.0 | 10.7 | 8.8 | 8.1 |
| Hysteresis at 70% compression [%] | 24.0 | 27.7 | 27.7 | 23.0 | 23.4 | n.d. | n.d. |
| Density [kg/m$^3$] | 55.3 | 56.4 | 56.4 | 50.6 | 51.0 | 55.2 | 55.2 |

TABLE 3-continued lists the mechanical properties that were ascertained for the foams of comparative example 8 and examples 2 to 5.

| | Comparison 7 | Example 4 | Example 5 | Example 6 | Example 7 | Comparison 8 | Example 10 |
|---|---|---|---|---|---|---|---|
| Compression set at 50% compression [%] | 9.5 | 5.8 | 5.8 | 6.2 | 6.5 | 9.5 | 11.7 |
| Compression set at 75% compression [%] | 62.8 | 7.1 | 7.1 | 7.3 | 7.8 | n.d. | n.d. |
| Compression set at 90% compression [%] | 83.2 | 57.5 | 57.5 | 64.9 | 76.3 | n.d. | n.d. |
| Tensile strength [kPa] | 90 | 107 | 107 | 117 | 122 | 92 | 80 |
| Elongation at break [%] | 99 | 106 | 106 | 107 | 109 | 95 | 97 |
| Air permeability [dm$^3$/s] | 0.349 | 0.901 | 0.901 | 0.477 | 0.410 | Closed index celled | open-cell |
| Rebound resilience [%] | 54 | 52 | 52 | 58 | 58 | 54 | 48 |
| Tear propagation resistance [N/mm] | 0.37 | 0.52 | 0.52 | 0.42 | 0.41 | 0.40 | 0.35 |
| Compression set after autoclave aging (50% compression/5 h/120° C., 3 cycles) [%] | 55.0 | 10.1 | 10.1 | 12.3 | 11.3 | 44.1 | 27.4 |
| Formaldehyde emission [µg/m$^3$] | 726 | n.d. | n.d. | n.d. | 341 | n.d. | n.d. |
| Acetaldehyde emission [µg/m$^3$] | 140 | n.d. | n.d. | n.d. | 60 | n.d. | n.d. |
| FOG* [ppm] | 259 | n.d. | n.d. | n.d. | 109 | n.d. | n.d. |

*measured according to the instructions for determining the emission values.
n.d. = not determined Table 3 shows that use of the catalysts according to the invention brings about in some cases considerable improvements in the measured mechanical properties. Improvements are seen, with comparable density of the foams, in the compression sets, measured at 50, 75 and 90% deformation, the open-cell content (measured as air permeability) and in particular and surprisingly the compression set after autoclave aging (50% compression/5 h/120° C., 3 cycles). These values were determined as follows:

| Mechanical testing | Method |
|---|---|
| Compression hardness at 25%, 40% and 65% compression | DIN EN ISO 3386 |
| Hysteresis at 70% compression | DIN EN ISO 3386 |
| Density | DIN EN ISO 845 |
| Compression set (22 h/70° C./50% compression) | DIN EN ISO 1856 |
| Compression set after autoclave aging | In accordance with DIN ISO 1856, after 5 h of storage in an autoclave at 120 degrees Celsius and 50% compression (3 cycles). |
| Tensile strength | DIN EN ISO 1798 |
| Elongation at break | DIN EN ISO 1798 |
| Tear propagation resistance (Graves with notch) | DIN EN ISO 34-1,B (b) |
| Rebound resilience | DIN EN ISO 8307 |

Emission Values:

The foam specimens from comparative example 8 and example 9 were analyzed using the chamber method followed by HPLC. Formaldehyde was determined by a procedure analogous to ASTM D-5116-06. The chamber size was 4.7 liters. The polyurethane specimens used were foams having a size of 110 mm×100 mm×25 mm from the core of the foam. The temperature in the measuring chamber during the measurement was 65° C., the relative humidity 50%. The air change rate was 3.0 liters per hour. The exhaust air stream comprising volatile aldehydes from the polyurethane was passed through a cartridge comprising silica coated with 2,4-dinitrophenylhydrazine over 120 minutes. The DNPH cartridge was then eluted with a mixture of acetonitrile and water. The concentration of formaldehyde in the eluate was determined by HPLC. In this setup the limit of detection for formaldehyde emissions is ≤11 µg/m$^3$.

In the context of the present invention, the content of aromatic amines was determined as follows:

The concentration of aromatic amines was determined on moldings made from molded flexible polyurethane foam in accordance with the ISOPA I.I.I. test method: detection method for MDA (ISOPA I.I.I. ref. 11399, "Robust method for the determination of the diaminodiphenylmethane content of flexible polyurethane foams"). To this end, the specimens were sawn after production and immediately packed in aluminum foil and a plastic bag. The duration between demolding and packaging was 30 min.

The surface of the molded foam was cut off in the form of panels having a thickness of 0.5 cm. Specimens measuring 3 cm×3 cm each were cut out from these panels and stacked together to form a cube of 3×3×3 cm and measured. The flexible foam cube was placed in a beaker with 10 ml of 1% acetic acid (given in % by mass). The cube was squeezed out twenty times using a ram (approx. 4 cm diameter) and the solution was transferred into a 50 ml flask. The compaction process was then repeated twice with 10 ml of 1% acetic acid each time, this acetic acid also being transferred into the flask after the compaction process. After combining the extracts obtained, the mixture was made up to 50 ml with 1% acetic acid. This solution was filtered through a 0.45 µm filter for preparation for the HPLC analysis. A double determination was carried out in all cases. The MDA contents are given in ppm.

The invention claimed is:

1. A process for producing polyurethane foams having a density of 30 g/dm$^3$ to 70 g/dm$^3$, the process comprising mixing
  a) aromatic polyisocyanate,
  b) polymeric compounds having isocyanate-reactive groups,
  c) optionally chain extender and/or crosslinking agent,
  d) catalysts,
  e) blowing agent comprising water,
  f) lactam in an amount of 0.1% to 5% by weight, based on the total weight of components a) to f), and
  g) optionally additives,
  at an isocyanate index of 50 to 95 to form a reaction mixture, and
  converting the reaction mixture to a flexible polyurethane foam,
  wherein the catalysts comprise a metal catalyst and an amine catalyst, and the amine catalyst has tertiary nitrogen atoms and is used in such an amount that a content of tertiary nitrogen atoms in the amine catalyst is from 0.0001 to 0.002 mol/100 g of foam;
wherein the amine catalyst has at least one isocyanate-reactive group;
wherein the catalysts d) are used in amounts such that the reaction mixture has a gel or fiber time in a range of from 60 to 180 seconds;
wherein the reaction mixture is converted to the flexible polyurethane foam in a closed mold.

2. The process according to claim 1, wherein the catalysts d) are used in amounts such that the reaction mixture has a rise time of 30 to 150 seconds.

3. The process according to claim 1, wherein a content of water, based on components b) to f), is 1% to 5% by weight.

4. The process according to claim 1, wherein no further blowing agents other than water are present.

5. The process according to claim 1, wherein the lactam f) is ε-caprolactam.

6. The process according to claim 1, wherein the amine catalyst has two tertiary nitrogen atoms.

7. The process according to claim 1, wherein the tertiary nitrogen atoms of the amine catalyst have at least one methylene radical $H_3C-$ or ethylene radical $H_3C-H_2C-$.

8. The process according to claim 1, wherein the amine catalyst is selected from the group consisting of bisdimethylaminopropylurea, bis(N,N-dimethylaminoethoxyethyl) carbamate, dimethylaminopropylurea, N,N,N-trimethyl-N-hydroxyethylbis(aminopropyl ether), N,N,N-trimethyl-N-hydroxyethylbis(aminoethyl ether), diethylethanolamine, bis(N,N-dimethyl-3-aminopropyl)amine, dimethylaminopropylamine, 3-dimethylaminopropyl-N,N-dimethylpropane-1,3-diamine, dimethyl-2-(2-aminoethoxyethanol) and (1,3-bis(dimethylamino)propan-2-ol), N,N-bis(3-dimethylaminopropyl)-N-isopropanolamine, bis(dimethylaminopropyl)-2-hydroxyethylamine, N,N,N-trimethyl-N-(3 aminopropyl)bis(aminoethyl ether), 3-dimethylaminoisopropyldiisopropanolamine, N-[2-[2-(dimethylamino)ethoxy]ethyl]-N-methyl-1,3-propanediamine, and mixtures thereof.

9. The process according to claim 1, wherein the metal catalyst is a tin(IV) catalyst.

10. The process according to claim 1, wherein the aromatic polyisocyanate comprises isomers and homologs of diphenylmethane diisocyanate.

11. The process according to claim 1, wherein, for the preparation of the reaction mixture, an isocyanate component (A), comprising aromatic polyisocyanate (a), and a polyol component (B), comprising a mixture comprising polymeric compounds having isocyanate-reactive groups b), catalysts d), and blowing agent comprising water e), are mixed.

12. A polyurethane foam obtainable by the process according to claim 1.

13. A method of producing cushions, seat cushions and mattresses comprising preparing the polyurethane foam according to claim 12 in the form of cushions, seat cushions, or mattresses.

14. The process according to claim 1, wherein the amine catalyst is used in such an amount that a content of tertiary nitrogen atoms in the amine catalyst is from 0.0001 to 0.001 mol/100 g of foam.

15. The process according to claim 1, wherein the catalysts d) are used in amounts such that the reaction mixture has a cream time in a range of from 10 to 30 seconds.

* * * * *